3,361,700
IODINATED ESTERS AND RESIN COMPOSITIONS
CONTAINING SAME
Sydney Archer, Bethlehem, N.Y., and Vincent J. Flynn,
Tenafly, N.J., assignors to Sterling Drug Inc., New
York, N.Y., a corporation of Delaware
No Drawing. Filed Apr. 26, 1965, Ser. No. 451,054
14 Claims. (Cl. 260—31.4)

This application is a continuation-in-part of copending application Ser. No. 125,641, filed July 21, 1961, now abandoned.

This invention relates to novel iodinated esters and useful compositions containing said esters. In particular the invention is concerned with resin compositions containing alkoxyalkyl esters of diiodobenzoic acid as radiopaque plasticizers.

The alkoxyalkyl esters of diiodobenzoic acids have the following formula

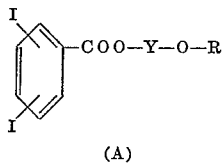

(A)

wherein Y is lower-alkylene and R is lower-alkyl or lower-alkoxy-lower-alkyl.

The lower-alkylene group Y preferably has from 2 to 4 carbon atoms, can be straight or branched, and has its free valences on different carbon atoms. It thus includes such groups as —$CH_2CH_2$—, —$CH_2CH_2CH_2$—, —$CH_2CH_2CH_2CH_2$—, —$CH(CH_3)CH_2$—,

—$CH_2CH(CH_3)$— and —$CH(CH_3)CH(CH_3)$—.

The lower-alkyl or lower-alkoxy-lower-alkyl group R preferably has from 1 to 6 carbon atoms and can be straight or branched. It thus includes such groups as $CH_3$, $CH_2CH_3$, $CH_2CH_2CH_3$, $CH_2CH_2CH_2CH_3$, $CH_2CH_2CH_2CH_2CH_2CH_3$ $CH_2CH_2OCH_3$, $CH_2CH_2OCH_2CH_3$, $CH(CH_3)_2$, $CH_2CH(OCH_3)CH_3$ and the like.

The orientation of the iodine atoms in the benzene ring is not critical, and the invention includes any of the six possible orientations, that is, esters of 2,3-diiodobenzoic acid, 2,4-diiodobenzoic acid, 2,5-diiodobenzoic acid, 2,6-diiodobenzoic acid, 3,4-diiodobenzoic acid, and 3,5-diiodobenzoic acid.

The compounds of the invention are prepared by treating a diiodobenzoyl healide, $I_2C_6H_3COX$, where X is halogen, preferably chlorine, with an alkoxyalkanol, HO—Y—O—R. Equimolar quantities or an excess of alkoxyalkanol is employed, and the reaction takes place at ordinary temperatures, although heat may be applied to speed up the reaction. An inert solvent can be used but it is not necessary.

The compounds of the above formula A are radiopaques and have unexpectedly been found to be particularly useful as plasticizers for compatible resins with the resulting compositions suitable for medical use. Such compositions can be employed to manufacture tubing, catheters and like products for internal medical use, which products are opaque to X-rays and readily visualized by fluoroscopic devices or in X-ray photographs. Specific applications of the radiopaque resin compositions are in the manufacture of the following products: stomach tubes, feeding tubes, irrigation tubes, Levin tubes, tubing for vein cutdown, paracentesis intubation sets, tubing for anesthesia applications; catheters and bougies for exploration, dilation, drainage, medication and the like; heart catheters; ureteral catheters; radiopaque sheeting for location and protection purposes, medical examination and surgeons' gloves; prosthetic appliances; and epoxy resin adhesives where X-ray inspection of adhered surfaces is desired.

Catheters opaqued for X-ray purposes by coating with a varnish containing bismuth powder, catheters having cellulose walls impregnated with bismuth powder, catheters painted with X-ray opaque paint, and cathers comprised of plastic tubes having continuous strips of plastic material with powdered X-ray opaque pigment dispersed therein are known in the art. These articles possess disadvantages in that pigmentation requires a relatively high plasticizer content to obtain sufficient flexibility of the plastic products, and the coating or dispersed pigment renders difficult the detection of structural defects arising from the catheter molding operations. Further, with coated catheters there is the possibility of coating separation which may result in renal calculi. If such occurs in the venous system there is a possibility of clot formation or other detrimental lodgment.

The compositions of the present invention are unique in that the iodinated esters serve a dual purpose, both as radiopaques and as plasticizers. The compositions possess a number of advantages not possessed by the known pigmented plastic compositions. A relatively low proportion of plasticizer is needed, thereby reducing extraction tendencies when the finished products are treated with solvents and yet the end product is characterized by extremely high tensile strength. Our resin formulations possess a greater flexibility relative to pigmented plastic formulations, and exhibit good extrusion characteristics. The finished products produced from our formulations are transparent to visible light (no pigmentation required for obtaining radiopacity), allowing any defects from the extrusion or molding operations to be easily detected, and the full contour of the articles is rendered uniformly opaque to X-rays.

The compounds of Formula A above are non-toxic. In any event, since they are water-insoluble, no appreciable amounts of the compounds are extracted by body fluids from the plastic products during use.

The radiopaque plasticizers of the invention are superior in both plasticizing and radiopaque properties to the corresponding compounds containing one iodine atom in the phenyl ring. The corresponding compounds having three iodine atoms in the phenyl ring are inoperative as plasticizers because they are relatively high-melting solids.

The nature of the resin constituent in our compositions is immaterial provided it is compatible with the radiopaque plasticizer and is suitable for medical use. Especially adaptable resins are the vinyl resins such as polyvinyl acetate and polyvinyl chloride (U.S. Patent 2,317,987).

The proportion of materials in the resin-radiopaque formulations of the invention may vary widely. If mere detection of the tubing, catheter, etc. is desired the formulation can contain as little as 10% by weight of radiopaque plasticizer. If high visualization is desired in such products, as much as about 52% of radiopaque plasticizer can be present. Where it is desired to have relatively high elastomeric properties in products, such as surgeons' gloves and sheeting, as much as 70% by weight of radiopaque plasticizer may be utilized. A preferred range of radiopaque plasticizer content is 30–45% by weight. The proportion of resin can vary from about 20 to about 80% by weight, a preferred range being 45–65% by weight. Varying amounts, up to about 20% by weight, of other plasticizers and stabilizers may be present. Resin-radiopaque plasticizer-lead powder formulations can easily be prepared where greater radiation barrier characteristics are desired.

The following examples will futher illustrate the invention without the latter being limited thereby.

EXAMPLE 1

(a) 2,5-diiodobenzoyl chloride

A mixture of 92.8 g. of 2,5-diiodobenzoic acid and 125 ml. of thionyl chloride was refluxed for three hours and then allowed to stand at room temperature for about fifteen hours. The excess thionyl chloride was removed in vacuo using a water aspirator. Carbon tetrachloride was added to the residue and the solution concentrated to dryness in vacuo, the operation being repeated to insure complete removal of thionyl chloride. The product was crystallized from carbon tetrachloride, using activated charcoal for decolorizing purposes, and there was obtained 78.8 g. of 2,5-diiodobenzoyl chloride, M.P. 91–94° C. (uncorr.).

(b) 2-ethoxyethyl 2,5-diiodobenzoate

A mixture of 78.8 g. of 2,5-diiodobenzoyl chloride, 36.2 g. of 2-ethoxyethanol and 50 ml. of dry benzene was refluxed for three hours and allowed to stand at room temperature for about fifteen hours. The reaction mixture was concentrated in vacuo on a steam bath, the residue was poured into water and the product extracted with ether. The ether extracts were washed with water, 10% sodium carbonate solution and again with water, dried over anhydrous sodium sulfate and concentrated. The residue was distilled and the fraction boiling at 177° C. (0.5 mm.) was collected to give 53 g. of 2-ethoxyethyl 2,5-diiodobenzoate.

*Analysis.*—Calcd. for $C_{11}H_{12}I_2O_3$: I, 56.91. Found: I, 56.76.

EXAMPLE 2

2-(n-butoxy)ethyl 2,5-diiodobenzoate 2,5-diiodobenzoyl chloride (473 g., 1.21 mole) was added portionwise over a period of five hours to 400 ml. of 2-(n-butoxy)ethanol with stirring at room temperature. The reaction mixture was heated on a steam bath for two hours, allowed to stand at room temperature for about fifteen hours and then poured into water. The product was extracted with chloroform, and the chloroform extracts were washed with water, 500 ml. of saturated sodium bicarbonated solution and again twice with water. The chloroform extracts were dried over anhydrous sodium sulfate and concentrated. The residue was distilled and a 482 g. fraction was collected boiling at 208–212° C. (0.1 mm.). The latter was redistilled twice to give 397 g. of 2-(n-butoxy)ethyl 2,5-diiodobenzoate, B.P. 172–175° C. (0.07 mm.); $n_D^{25}=1.6001$.

*Analysis.*—Calcd. for $C_{13}H_{16}I_2O_3$: C, 32.93; H, 3.40; I, 53.5. Found: C, 33.24; H, 3.37; I, 53.8.

EXAMPLE 3

2-(2-methoxyethoxy)ethyl 2,5-diiodobenzoate 2,5-diiodobenzoyl chloride (500 g., 1.27 mole) and 400 ml. of 2-(2-methoxyethoxy)ethanol were combined over a period of about twenty minutes. The mixture was heated on a steam bath for four and one-half hours and worked up as described above in Example 2. The product was purified by distillation four times to give 326 g. of 2-(2-methoxyethoxy)ethyl 2,5-diiodobenzoate, B.P. 174–176° C. (0.07 mm.); $n_D^{25}=1.6147$.

*Analysis.*—Calcd. for $C_{12}H_{14}I_2O_4$: C, 30.27; H, 2.96. Found: C, 29.98; H, 2.80.

By replacing the 2,5-diiodobenzoyl chloride in Example 1, part (b) by an equal amount of 2,3-diiodobenzoyl chloride, 2,4-diiodobenzoyl chloride, 2,6-diiodobenzoyl chloride, 3,4-diiodobenzoyl chloride, or 3,5-diiodobenzoyl chloride, there can be obtained, respectively, 2-ethoxyethyl 2,3-diiodobenzoate, 2-ethoxyethyl 2,4-diiodobenzoate, 2-ethoxyethyl 2,6-diiodobenzoate, 2-ethoxyethyl 3,4-diiodobenzoate, or 2-ethoxyethyl 3,5-diiodobenzoate.

By replacing the 2-ethoxyethanol in Example 1, part (b) by a molar equivalent amount of 3-ethoxypropanol, 4-ethoxybutanol, 2-ethoxypropanol, 2-ethoxy-1-methylpropanol, 2-isopropoxyethanol, 2-(n-hexoxy)ethanol, or 2-[2-(n-butoxy)ethoxy]ethanol, there can be obtained, respectively, 3-ethoxypropyl 2,5-diiodobenzoate, 4-ethoxybutyl 2,5-diiodobenzoate, 2-ethoxypropyl 2,5-diiodobenzoate, 2-ethoxy-1-methylpropyl 2,5-diiodobenzoate, 2-isopropoxyethyl 2,5-diiodobenzoate, 2-(n-hexoxy)ethyl 2,5-diiodobenzoate, or 2-[2-(n-butoxy)ethoxy]ethyl 2,5-diiodobenzoate.

FORMULATION 1

*Tubing.*—Extruded heart catheters, vein intubation sets and ureteral catheters where tubings must be relatively stiff.

| Constituents: | Parts by weight |
|---|---|
| Resin (straight polyvinyl chloride) | 600 |
| 2-ethoxyethyl 2,5-diiodobenzoate | 300 |
| Dioctyl phthalate plasticizer | 20 |
| Epoxy plasticizer | 70 |
| Calcium zinc stabilizer | 10 |
| | 1000 |

FORMULATION 2

*Tubing.*—Extruded Levin tubes and stomach tubes where such tubings when used during radiographic work must be relatively flexible and soft.

| Constituents: | Parts by weight |
|---|---|
| Resin (straight polyvinyl chloride) | 580 |
| 2-ethoxyethyl 2,5-diiodobenzoate | 320 |
| Dioctyl phthalate plasticizer | 30 |
| Epoxy plasticizer | 60 |
| Calcium zinc stabilizer | 10 |
| | 1000 |

The dioctyl phthalate plasticizer is commercially available di-2-ethylhexyl phthalate having a boiling point of 384.0° C. (760 mm.) and refractive index $n_D^{25}=1.4836$.

The epoxy plasticizer is a high molecular weight epoxidized oil plasticizer having an average molecular weight of 1000, specific gravity 0.999, viscosity 3–4 poises (25° C.), refractive index $n_D^{25}=1.471$, freezing point 2° C., acid number (max.) 9 mg. KOH/g., and saponification number 182 mg. KOH/g.

The calcium zinc stabilizer is a fluid paste containing non-toxic compounds of calcium and zinc. It is white and is insoluble in most common solvents and plasticizers.

FORMULATION 3

| Constituents: | Parts by weight |
|---|---|
| Resin (straight polyvinyl chloride) | 570 |
| 2-butoxyethyl 2,5-diiodobenzoate | 330 |
| Dioctyl phthalate plasticizer | 30 |
| Epoxy plasticizer | 60 |
| Calcium zinc stabilizer | 10 |
| | 1000 |

FORMULATION 4

| Constituents: | |
|---|---|
| Resin (straight polyvinyl chloride) | 500 |
| 2-butoxyethyl 2,5-diiodobenzoate | 420 |
| Epoxy plasticizer | 70 |
| Calcium zinc stabilizer | 10 |
| | 1000 |

FORMULATION 5

Constituents:
- Resin (straight polyvinyl chloride) ............ 580
- 2-(2-methoxyethoxy)ethyl 2,5 - diiodobenzoate ............ 320
- Dioctyl phthalate plasticizer ............ 30
- Epoxy plasticizer ............ 60
- Calcium zinc stabilizer ............ 10

1000

We claim:

1. A composition of matter comprising from 20 to 80% by weight of polyvinyl chloride or polyvinyl acetate resin containing as a plasticizer from 10 to 70% by weight of a radiopaque compound having the formula

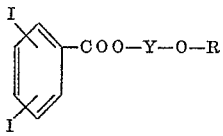

wherein Y is lower-alkylene of 2–4 carbon atoms and R is a member of the group consisting of lower-alkyl of 1–6 carbon atoms and lower-alkoxy-lower-alkyl of 1–6 carbon atoms; and from 7 to 20% by weight of conventional plasticizers.

2. A composition of matter comprising from 20 to 80% by weight of polyvinyl chloride resin; and from 10 to 70% by weight of a radiopaque compound having the formula

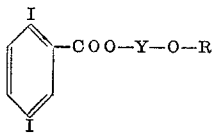

wherein Y is lower-alkylene of 2–4 carbon atoms and R is lower-alkyl of 1–6 carbon atoms; and from 7 to 20% by weight of conventional plasticizers.

3. A composition of matter comprising from 20 to 80% by weight of polyvinyl chloride resin; and from 10 to 70% by weight of a radiopaque compound having the formula

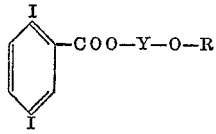

wherein Y is lower-alkylene of 2–4 carbon atoms and R is lower-alkoxy-lower-alkyl of 1–6 carbon atoms; and from 7 to 20% by weight of conventional plasticizers.

4. A composition of matter comprising from 45 to 65% by weight of polyvinyl chloride resin; and from 30 to 45% by weight of a radiopaque compound having the formula

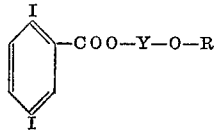

wherein Y is lower-alkylene of 2–4 carbon atoms and R is lower-alkyl of 1–6 carbon atoms; and from 7 to 20% by weight of conventional plasticizers.

5. A composition of matter comprising from 45 to 65% by weight of polyvinyl chloride resin; and from 30 to 45% by weight of a radiopaque compound having the formula

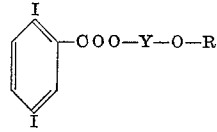

wherein Y is lower-alkylene of 2–4 carbon atoms and R is lower-alkoxy-lower-alkyl of 1–6 carbon atoms; and from 7 to 20% by weight of conventional plasticizers.

6. A composition of matter comprising from 45 to 65% by weight of polyvinyl chloride, from 30 to 45% by weight of 2-ethoxyethyl 2,5-diiodobenzoate; and from 7 to 9% by weight of conventional plasticizers.

7. A composition of matter comprising from 45 to 65% by weight of polyvinyl chloride resin, from 30 to 45% by weight of 2-butoxyethyl 2,5-diiodobenzoate; and from 7 to 9% by weight of conventional plasticizers.

8. A composition of matter comprising from 45 to 65% by weight of polyvinyl chloride resin, from 30 to 45% by weight of 2-(2-methoxyethoxy)ethyl 2,5-diiodobenzoate; and from 7 to 9% by weight of conventional plasticizers.

9. A compound having the formula

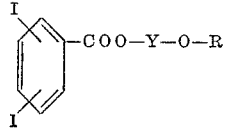

wherein Y is lower-alkylene of 2–4 carbon atoms and R is a member of the group consisting of lower-alkyl of 1–6 carbon atoms and lower-alkoxy-lower-alkyl of 1–6 carbon atoms.

10. A compound having the formula

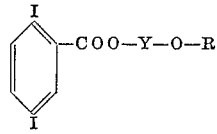

wherein Y is lower-alkylene of 2–4 carbon atoms and R is lower-alkyl of 1–6 carbon atoms.

11. A compound having the formula

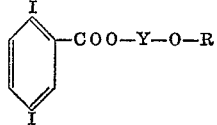

wherein Y is lower-alkylene of 2–4 carbon atoms and R is lower-alkoxy-lower-alkyl of 1–6 carbon atoms.

12. 2-ethoxyethyl 2,5-diiodobenzoate.
13. 2-butoxyethyl 2,5-diiodobenzoate.
14. 2-(2-methoxyethoxy)ethyl 2,5-diiodobenzoate.

References Cited

UNITED STATES PATENTS

| | | | |
|---|---|---|---|
| 2,403,794 | 7/1946 | Goldrick et al. | 252—478 |
| 2,612,517 | 9/1952 | Archer | 260—476 |

FOREIGN PATENTS

| | | |
|---|---|---|
| 517,382 | 1/1940 | Great Britain. |

OTHER REFERENCES

Simonds et al., "A Concise Guide to Plastics," second Edition, 1963, pages 69–73 (Library Call No. TP 986 A2584 C 1963 C.3).

ALLAN LIEBERMAN, *Primary Examiner.*

MORRIS LIEBMAN, *Examiner.*